United States Patent
Ittycheriah et al.

(10) Patent No.: US 6,192,337 B1
(45) Date of Patent: Feb. 20, 2001

(54) APPARATUS AND METHODS FOR REJECTING CONFUSIBLE WORDS DURING TRAINING ASSOCIATED WITH A SPEECH RECOGNITION SYSTEM

(75) Inventors: Abraham Ittycheriah; Stephane H. Maes, both of Danbury, CT (US)

(73) Assignee: International Business Machines Corporation, Armonk, NY (US)

( * ) Notice: Under 35 U.S.C. 154(b), the term of this patent shall be extended for 0 days.

(21) Appl. No.: 09/134,259

(22) Filed: Aug. 14, 1998

(51) Int. Cl.$^7$ .................................................. G10L 15/06
(52) U.S. Cl. ............................................ 704/231; 704/239
(58) Field of Search ................................... 704/231, 232, 704/251, 255, 254, 238, 239

(56) References Cited

U.S. PATENT DOCUMENTS

| | | | |
|---|---|---|---|
| 4,829,576 | 5/1989 | Porter | 381/43 |
| 4,918,732 * | 4/1990 | Gerson et al. | 704/251 |
| 5,033,087 | 7/1991 | Bahl et al. | 381/43 |
| 5,218,668 * | 6/1993 | Higgins et al. | 704/200 |
| 5,349,645 | 9/1994 | Zhao | 704/243 |
| 5,621,857 * | 4/1997 | Cole et al. | 704/232 |
| 5,625,748 * | 4/1997 | McDonough et al. | 704/251 |
| 5,675,704 * | 10/1997 | Juang et al. | 704/246 |
| 5,680,511 * | 10/1997 | Baker et al. | 704/257 |
| 5,715,367 * | 2/1998 | Gilick et al. | 704/254 |
| 5,752,001 | 5/1998 | Dulong | 395/500 |
| 5,778,344 | 7/1998 | Attwater et al. | 704/275 |
| 5,850,627 * | 12/1998 | Gould et al. | 704/231 |
| 5,852,801 | 12/1998 | Hon et al. | 704/244 |
| 5,864,810 * | 1/1999 | Digalakis et al. | 704/255 |
| 6,005,549 | 12/1999 | Forest | 345/157 |
| 6,023,673 * | 2/2000 | Bakis et al. | 704/231 |

* cited by examiner

*Primary Examiner*—David R. Hudspeth
*Assistant Examiner*—Susan Wieland
(74) *Attorney, Agent, or Firm*—F. Chau & Associates, LLP (57) ABSTRACT

A method of training at least one new word for addition to a vocabulary of a speech recognition engine containing existing words comprises the steps of: a user uttering the at least one new word; computing respective measures between the at least one newly uttered word and at least a portion of the existing vocabulary words, the respective measures indicative of acoustic similarity between the at least one word and the at least a portion of existing words; if no measure is within the threshold range, automatically adding the at least one newly uttered word to the vocabulary; and if at least one measure is within a threshold range, refraining from automatically adding the at least one newly uttered word to the vocabulary.

35 Claims, 3 Drawing Sheets

APPARATUS AND METHODS FOR REJECTING CONFUSIBLE WORDS DURING TRAINING ASSOCIATED WITH A SPEECH RECOGNITION SYSTEM

CROSS REFERENCE TO RELATED APPLICATIONS

This application is being filed concurrent with U.S. patent application No. 09/134,584 (728-107) entitled "APPARATUS AND METHODS FOR IDENTIFYING POTENTIAL ACOUSTIC CONFUSIBILITY AMONG WORDS IN A SPEECH RECOGNITION SYSTEM" and U.S. patent application No. 09/134,261 entitled "APPARATUS AND METHODS FOR IDENTIFYING HOMOPHONES AMONG WORDS IN A SPEECH RECOGNITION SYSTEM".

BACKGROUND OF THE INVENTION

Developments in speech recognition technology have led to widespread and varied use of speech recognition systems in applications which rely on spoken input words or commands to perform some function. The use of speech recognition techniques in a repertory telephone voice dialer application is one example. It is known that the repertory dialing application allows users to train their own vocabularies for the purpose of associating a phone number to be dialed with each entry in the vocabulary. This can also be applied to other situations when a vocabulary word is trained and the system takes some action when the word is subsequently recognized. However, the list of words often grows to such an extent that it is difficult for an application user to remember when a word has already been entered. Alternatively, a large vocabulary also poses a problem to a user when a word is too similar to another one such that the speech recognizer is much less accurate on these words, if they appeared on the same list.

Traditionally, such systems have attempted to offer the capability to reject such utterances based on comparing the input speech for training the current word to all previously enrolled models. This requires a match that produces often one or more (in systems using N-best outputs) words and, if the resulting word is not the currently trained one or it is a word which has a very poor score, the utterance is added. This technique ignores the models themselves and uses only the correlation between the input speech and the collection of models to do the rejection.

Now, while the traditional systems attempt to handle detecting similar words, these systems cannot handle the case when two or more lists are being combined or more generally the case of manipulating vocabularies when the input audio is no longer available.

SUMMARY OF THE INVENTION

It is to be appreciated that the present invention applies to the rejection not only of homonyms (acoustically similar words) but to the more general category of acoustically similar sounds known as homophones. Accordingly, it is to be understood that the term homophone, as referred to herein, includes acoustically similar single and multiple phone words as well as individual phones themselves, whereby the words or phones may have meanings and/or no meanings at all.

The present invention provides apparatus and methods to reject acoustically trained words by comparing the set of models to determine if any words in the vocabulary are homophones. If so, then the word is rejected and not added to the vocabulary.

The method preferably involves taking, as input, the set of models to be checked and doing a distance metric on the models to produce a score and subsequently comparing this score with a threshold, and those words which fall under this threshold are declared to be homophones and rejected.

In a repertory dialing application, a user is allowed to add names to the system. When the list size is quite large, it's often possible that the user will try to enter either a name that sounds too close to another name on the list, such that recognition accuracy will suffer, or may try to enter a duplicate name. The present invention provides apparatus and methods which compare the models directly to see when phrases are too similar.

In one aspect of the invention, a method of training at least one new word for addition to a vocabulary of a speech recognition engine containing existing words comprises the steps of: a user uttering the at least one new word; computing respective measures between the at least one newly uttered word and at least a portion of the existing vocabulary words, the respective measures indicative of acoustic similarity between the at least one word and the at least a portion of existing words; if no measure is within the threshold range, automatically adding the at least one newly uttered word to the vocabulary; and if at least one measure is within a threshold range, refraining from automatically adding the at least one newly uttered word to the vocabulary.

These and other objects, features and advantages of the present invention will become apparent from the following detailed description of illustrative embodiments thereof, which is to be read in connection with the accompanying drawings in which the same reference numerals are used throughout the various figures to designate same or similar components.

DETAILED DESCRIPTION OF PREFERRED EMBODIMENTS

It is to be appreciated that the present invention assumes that a list of words with unknown spellings is about to be trained acoustically, for the purpose of some application, for example, repertory dialing. Typically, when the first word is being trained, the user may follow the following procedure, i.e., he is asked to say a phrase, then perhaps to repeat it again, and then the word is considered trained. An example of how to train such words is disclosed in U.S. patent application Ser. No. 09/015,150, entitled "Apparatus and Method for Generating Phonetic Transcriptions from Enrollment Utterances," filed on Jan. 29, 1998, the disclosure of which is incorporated herein by reference.

However, in a departure from conventional techniques and as will be explained in detail herein, the present invention provides the capability to reject words as they are being trained based on the fact that the models contain only sequences of homophones, with respect to existing vocabulary words, and thus may be declared too similar.

For example, two words which may be trained in a vocabulary may be:

| | |
|---|---|
| Word 2 | HH AE N K IX D IY F EH B IX Z IY AX N |
| Word 52 | HH EH N T EH DX IY F EH BD K IX Z IY AA L |

In this example, the user is trying to train the name "Anthony Fabrizio," twice. However, if the second word is allowed in the vocabulary, then subsequent real-time recognition by the associated speech recognizer will be almost random. That is, the process of determining which word is output as the decoded word, when one subsequently tries to recognize the word, will likely result in a random outputting of any acoustically similar words in the existing vocabulary in response to the utterance of a particular word. In this case, the conventional technique of comparing the input speech with the first token may result in marginal accuracy; however, the conventional approach ignores the relationship between the input speech and all the other models and this is one aspect where the present invention, which directly compares the created models as will be explained, provides improved accuracy.

Here are some examples of words (e.g., names) which are homophones but are difficult to detect without doing a direct model comparison (the numerical data next to the words will be explained below):

```
KWEDAR (148951) QUETTA (218253) 1097.989014
KYME (149030) TYMN (273347) 453.884491
KYMER (149031) THEIMER (264322) 453.884491
KYMER (149031) TIMER (266350) 453.884491
KYMPER (149032) PIMPER (210767) 619.169617
KYNARD (149035) TEINERT (262655) 1007.658508
KYNARD (149036) VENARD (277388) 1675.401855
```

While the following description explains the invention in terms of a single word or command, it is to be understood that the homophone rejection facility of the invention also applies to the rejection of individual acoustically similar phones in response to the utterance of any particular word or phone.

Figure 1:
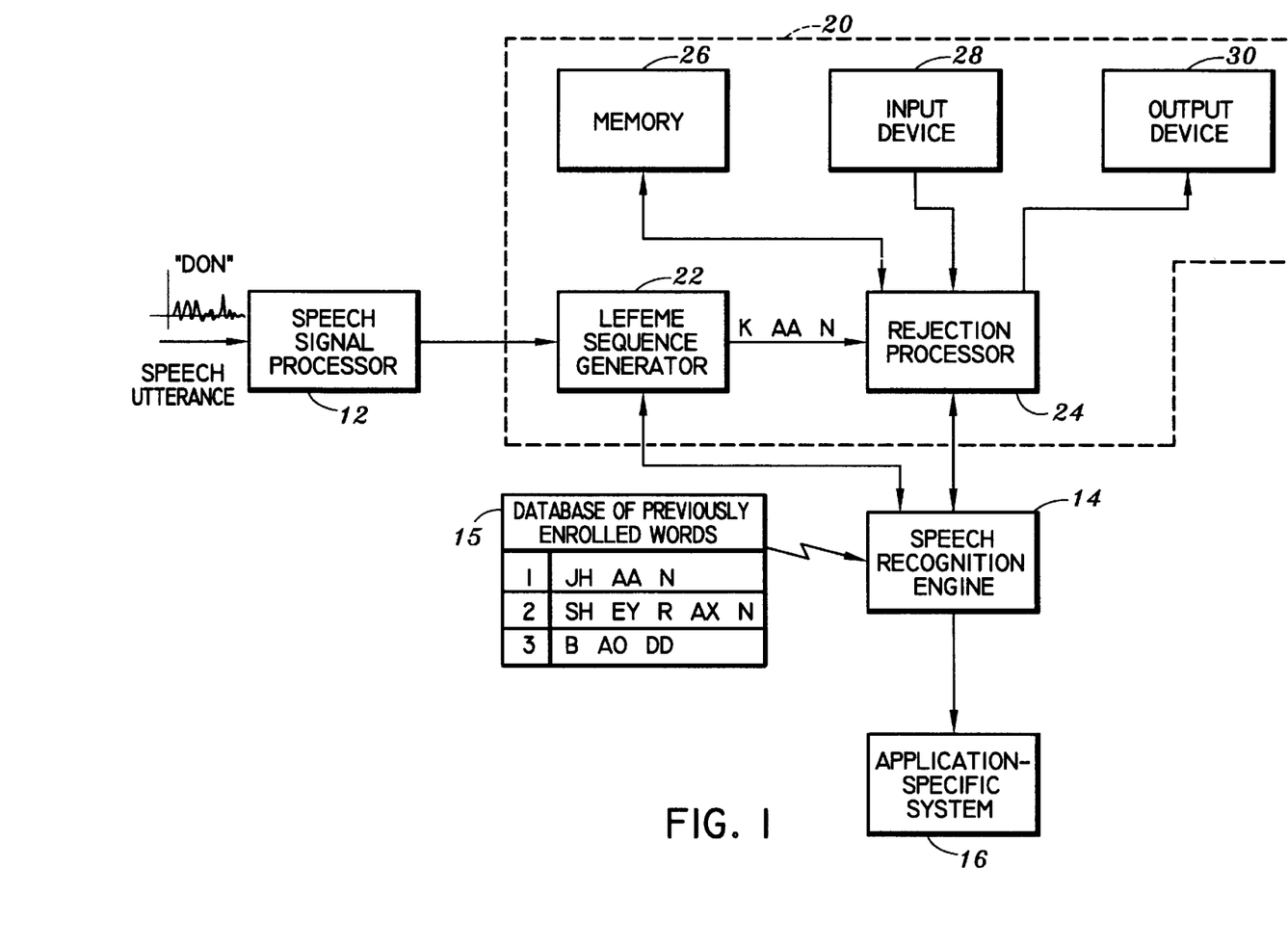
FIG. 1 is a block diagram of a speech recognition system in conjunction with a homophone rejection facility according to the present invention.

Referring initially to FIG. 1, a block diagram is shown of: a homophone rejection facility 20 according to the present invention in conjunction with portions of a speech recognition system including a speech signal processor 12 and a speech recognition engine 14. As shown, the homophone rejection facility 20 is operatively interposed between the speech signal processor 12 and the speech recognition engine 14. Also shown in FIG. 1 is an application-specific system 16, operatively coupled to the speech recognition engine 14, with which the speech recognition system is employed to provide speech recognition functions in response to input utterances. By way of example, the application-specific system 16 may be a repertory voice dialing system which permits a user to utter the name of a person for whom he wishes the dialer to dial an associated telephone number. As is known, the speech signal processor 12 may, itself, include a speech utterance pre-processor and an acoustic front-end.

It is to be appreciated that the present invention is usable with any speech recognition system and is not, in any way, limited to use with or dependent on any details or methodologies of any particular speech recognition arrangement. For instance, even generalized speech recognition systems such as the commercially available large vocabulary IBM Corporation ViaVoice or ViaVoice Gold (both trademarks of IBM Corporation) systems may be adapted to permit and/or perform homophone rejection functions in accordance with the invention. In any case, it should be understood that the elements illustrated in FIG. 1 may be implemented in various forms of hardware, software, or combinations thereof. As such, the main recognition elements (e.g., speech recognition engine), the lefeme sequence generator and the homophone rejection processor are implemented in software on one or more appropriately programmed general purpose digital computers. Each general purpose digital computer may contain, for example, a central processing unit (CPU) operatively coupled to associated system memory, such as RAM, ROM and a mass storage device, via a computer interface bus. Accordingly, the software modules performing the functions described herein may be stored in ROM or mass storage and then loaded into RAM and executed by the CPU. As a result, FIG. 1 may be considered to include a suitable and preferred processor architecture for practicing the invention which may be achieved by programming the one or more general purpose processors. Of course, special purpose processors may be employed to implement the invention. The speech recognition engine 14, the lefeme sequence generator 22 and the homophone rejection processor 24 are, therefore, functional blocks illustrating the computer facility or facilities executing their respective functions. Memory 26, input device 28 and output device 30 are preferably part of the computer facility implementing the functions of the processor 24. Also, the speech signal processor 12 may be implemented via a digital signal processor operatively coupled to such computer facilities (e.g., via the computer interface bus), as is known in the art. Given the teachings of the invention provided herein, one of ordinary skill in the related art will be able to contemplate these and similar implementations of the elements of the invention.

A brief explanation of the functionality of the components of the speech recognition system will now be given. The speech signal processor 12 receives the speech uttered by a speaker and generates representative speech waveforms. As mentioned, the speech signal processor 12 may include a speech utterance pre-processor and an acoustic front-end. The speech utterance pre-processor, itself, may include an audio-to-analog transducer (microphone) and an analog-to-digital converter which respectively transduce the utterances into an electrical signal and then convert the electrical signal into a digital signal representative of the speech uttered. Further, the pre-processor may preferably sample the speech signal and partition the signal into overlapping frames so that each frame is discretely processed by the remainder of the system. The output signal of the pre-processor is the sampled speech waveforms which are provided to the acoustic front-end. The acoustic front-end receives the speech waveforms and, as is known in the art, generates feature vectors (signals) therefrom. Physiologically related mel cepstra, delta and delta-delta feature vectors are preferred for efficiency and effectiveness of recognition, although other known feature vectors may be used.

During conventional recognition, as is known, the speech recognition engine 14 uses the feature vectors provided by the speech signal processor 12 to perform the process of decoding the word or words uttered by the speaker. The decoded word(s) is then presented to the application-specific system 16. As mentioned, the application-specific system 16 may be any system that employs the decoded speech signals as input. For example, the system 16 may be a telephone voice dialing system whereby the spoken utterances received by the speech recognition system represent user commands, names of persons to be dialed, etc. By way of another example, the system 16 may be a security access controller which selectively permits or denies access to a facility or service whereby the spoken utterances received by the speech recognition system represent passwords, user identification information, etc. Of course, the above applications are merely examples and, as such, the present invention is not intended to be limited thereby.

Figure 2:
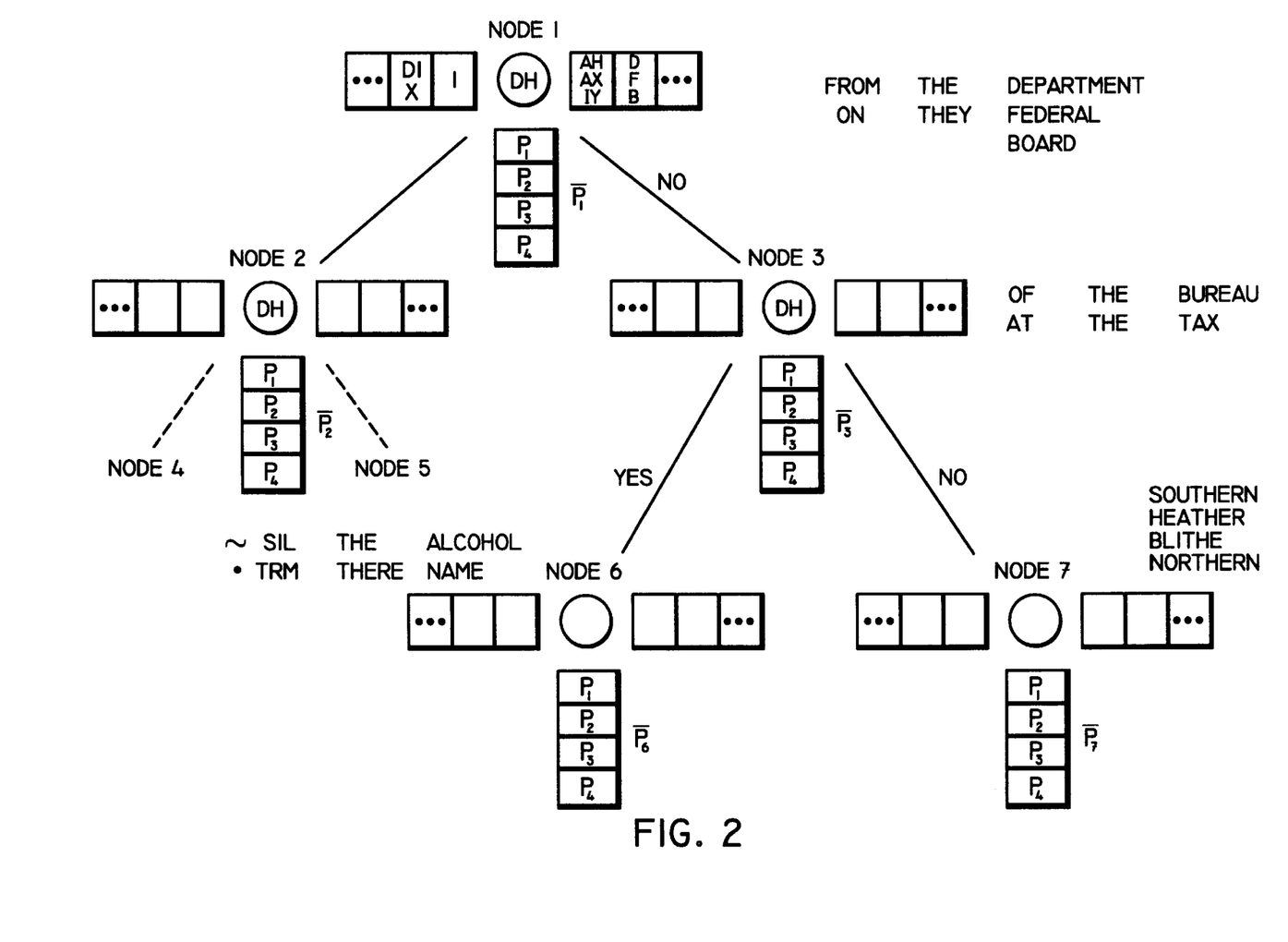
FIG. 2 is a diagram illustrating an example of a decision tree employed in an embodiment of a speech recognition engine.

In a preferred embodiment of the speech recognition engine 14, a decision tree model for each phone in the system is created. Referring to FIG. 2, an illustration of a hierarchical decision tree is shown. The leaves of this tree represent different contexts for each phone. The leaves contain a mixture gaussian prototype typically with 10 mixtures, each mixture with 39 dimensions. In this embodiment, there are fifty-one phones, and each phone has three such trees. Each tree is trained by a set of questions which segment the data. The result is a set of mixture gaussians:

$$\overline{P}_1, \overline{P}_2, \ldots, \overline{P}_N$$

which can be compared as sequences of such prototypes associated to the words. However, any conventional method may be employed. For example, the systems and methods disclosed in the following articles may be employed: L. R. Bahl et al., "A Fast Approximate Acoustic Match for Large Vocabulary Speech Recognition," IEEE Transactions on Speech and Audio Processing, vol. 1, no. 1, pp 59–67, January 1993 and in L. R. Bahl et al., "Performance of the IBM Large Vocabulary Continuous Speech Recognition System on the ARPA Wall Street Journal Task," ICASSP 1995, vol 1, pp 41–44. The present invention also assumes that the speech recognition engine 14 includes a large vocabulary along with the corresponding lefeme tree and baseforms. It is also known that words may be added to a system using phonetic baseforms, for example, R. C. Rose and E. Lleida, "Speech Recognition Using Automatically Derived Baseforms", ICASSP 1997, pp. 1271–1274; L. R. Bahl, S. Das, P. V. deSouza, M. Epstein, R. L. Mercer, B. Merialdo, D. Nahamoo, M. A. Picheny, J. Powell, "Automatic Phonetic Baseform Determination", Proc. Speech and Natural Language Workshop, pp. 179–184, June 1990; and J. M. Lucassen and R. L. Mercer, "An Information Theoretic Approach to the Automatic Determination of Phonemic Baseforms", in Proceedings of the IEEE International Conference on Acoustics, Speech and Signal Processing, pp. 42.5.1–42.5.4, 1984.

Referring again to FIG. 1, the homophone rejection facility 20 of the invention includes a lefeme sequence generator 22 and a homophone rejection processor 24 operatively coupled thereto. The lefeme sequence generator 22 is operatively coupled to the speech signal processor 12 and the speech recognition engine 14. The homophone rejection processor 24 is operatively coupled to the speech recognition engine 14, memory 26, an input device 28, and an output device 30. As previously mentioned, it is to be understood that the operations performed in accordance with the lefeme sequence generator 22 and the homophone rejection processor 24, to be described below, are preferably accomplished via one or more software modules executed on one or more appropriately programmed general purpose digital computers, for example, as described above. The output device 30 may be a visual display (e.g., CRT) which preferably allows the speaker who uttered a word to be added to the vocabulary to be informed of words which the homophone rejection facility has rejected as homophones of the uttered word. That is, the display may serve to provide the user with, inter alia, information concerning the acoustic similarity between the uttered word and one or more other existing vocabulary words in the recognition engine. The output device 30 may also be a printer or another computer. Alternatively, the output device 30 may be a text-to-speech (TTS) system which takes the results produced by the rejection processor 24 and synthesizes them into speech for audible indication to the user, rather than just visual indication. Any conventional TTS system may be employed for output device 30. The input device 28 may be a standard keyboard or other conventional means (e.g., mouse) for permitting the user to make entries or selections in accordance with the homophones identified and displayed by the output device 30. The input device 28 may also be a microphone which permits the user to utter his entries or selections. As mentioned, the input and output devices are preferably part of the computer system performing the functions of the rejection processor 24. Also, memory 26 is preferably part of the same computer system and is used in cooperation with the functional software modules executed by processor 24, as will be explained.

Figure 3:
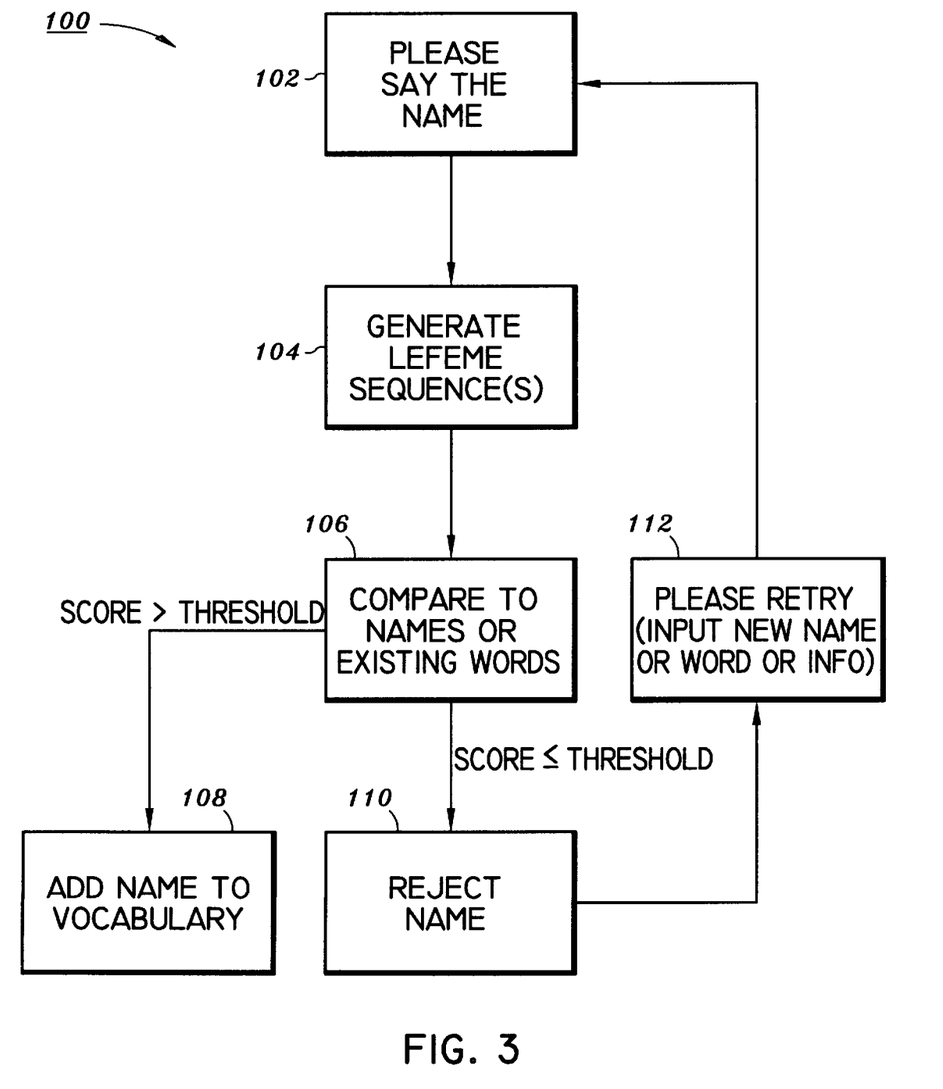
FIG. 3 is a flow chart illustrating homophone rejection according to the present invention.

A detailed description of a preferred method 100 of rejecting homophones in response to an uttered word during training will now be given in the context of FIG. 3.

At step 102, the speaker utters the name (or word or command) that he desires to be added to the vocabulary of the speech recognition engine 14. An example of a vocabulary associated with the speech recognition engine 14 is illustrated as database 15 in FIG. 1. The spoken utterance is received and processed by the speech signal processor 12, as explained above.

As mentioned, in the conventional approach, if the uttered name is determined not to be previously trained or results in a previously trained word with a poor score, the uttered name is simply added to the vocabulary database associated with the speech recognition engine. That is, due to an inability of the conventional training approaches to automatically identify words from the existing vocabulary that are acoustically similar to the uttered word which the user intends to add, the potentially acoustically confusing word is just added to the vocabulary. Then, when the added word is again uttered during real-time use of the application, due to the acoustic similarity between words, the engine may likely select the wrong word as the decoded word, thus yielding application problems. In the case of a repetory dialer, the inaccurate recognition output results in the wrong telephone number being dialed.

It is known that a speech recognition engine associates a baseform and leaf sequences with all the words in the existing vocabulary. The baseform of a word is a sequence of phonetic units (e.g., phones) that make up the word. Examples of baseforms for given words may be:

| WORDS | PHONETIC DESCRIPTION |
| --- | --- |
| A | \| AX |
| ADAPTER | \| AX D AE PD T AXR |
| ADAPTERS | \| AX D AE PD T AXR Z |
| AGENT | \| EY JH AX N TD |
| AGENTS | \| EY JH AX N TS |
| AIX | \| EY AY EH K S |

-continued

| WORDS | PHONETIC DESCRIPTION |
|---|---|
| ANALYSIS | \| AX N AE L AX S AX S |
| ANALYSIS | \| AX N AE L IX S IX S |

Many words may have more than one baseform depending on how they are pronounced. For instance, the word "ANALYSIS" may be pronounced with the vowels "Y" and "I" being a short "A" sound (AX) or a short "I" sound (IX).

However, since the word (e.g., name) that the user is attempting to add to the vocabulary is entered via acoustic means, i.e., the word is being uttered by the user, and since the word is supposedly untrained and, therefore, new to the speech recognition engine, there is no baseform and, thus, no lefeme sequence available for the word that the user wants to add. Thus, at step 104, a lefeme sequence for the uttered new word is generated.

This is preferably performed by the lefeme sequence generator 22. The lefeme sequence generator 22 is preferably a ballistic labeler as disclosed in U.S. patent application Ser. No. 09/015,150, entitled "Apparatus and Method for Generating Phonetic Transcriptions from Enrollment Utterances," filed on Jan. 29, 1998, the disclosure of which is incorporated herein by reference. Given the acoustic stream analyzed into feature vectors corresponding to the uttered word received from the speech signal processor 12, the ballistic labeler predicts the baseform as follows. The ballistic labeler contains a database of the probabilities that one phone, arc, or subunit will transition to another phone, arc, or subunit. The prediction begins by assuming that the acoustic stream starts in silence. The labeler then predicts which phone can follow silence (almost all phones can follow silence) and the labeler continues to produce a trellis of possibilities using the database of probabilities to guide the process along a forward path.

This portion of the process is referred to as the forward Viterbi pass. Pruning may be done here. After, the forward pass is completed, the labeler performs a backtrack to find the best path and, along this path, the labeler outputs the symbols which comprise the predicted baseform. Then, using the predicted baseform representative of the input utterance, the lefeme sequence generator 22 generates a corresponding lefeme sequence in cooperation with the hierarchical decision tree model associated with the speech recognition engine 14. As is known, a leaf fitting the current phonetic context is extracted from the appropriate decision tree model for each phone of the baseform. Accordingly, a leaf sequence corresponding to the predicted baseform is formed for the word uttered by the user.

It is to be appreciated that the lefeme (leaf) sequences are preferably used to determine the degree of acoustic similarity between the new word and the other vocabulary words. The leaf sequences for existing words are preferably previously generated from baseforms entered by a user in initially creating a vocabulary. The baseforms and lefeme sequences are stored in the database 15 in association with their respective vocabulary word. Thus, the leaf sequences for the existing words are available for comparison, in step 106, to the leaf sequence of the newly uttered word.

The rejection processor 24 performs the comparison step 106. The step of comparing the newly uttered word to all existing vocabulary words (step 106) to determine potential acoustic confusibility may be accomplished in many ways. A preferred manner involves aligning the newly uttered word and the existing words in the vocabulary and then calculating respective distance measures or scores therebetween. The distance measure associated with the newly uttered word and any one word from the vocabulary is preferably generated by respectively comparing leaves from the lefeme sequence (generated by the lefeme sequence generator 22) of the newly uttered word with leaves from the lefeme sequence of the existing word. A measure or score is generated for each pair-wise leaf comparison and the total distance measure for the words is calculated by adding up the pair-wise leaf scores.

The alignment process performed by the rejection processor 24 also preferably handles comparisons of unequal words. That is, a newly uttered word may have more or less phones than a particular existing word. In this event, comparison is still possible by implementing a best alignment process between the words. An example of such a best alignment process is the well-known Viterbi algorithm. The Viterbi alignment process supposes that since the acoustic models of the speech recognition engine are aligned left to right against incoming speech vectors, then when performing distance calculations to find the best match of leaves of a first word to those of a second word, left to right alignment will ensure a best match regardless if there is unequality in the number of phones.

An example of phonetically unequal length words is as follows:

| TRACE | \| TR EY S |
|---|---|
| TRAILS | \| TR EY L S |

The words "TRACE" and "TRAILS" are unequal in phonetic length because they are different by a phone. Another example of the need for an alignment algorithm is in comparing such words as "AUSTIN" and "BOSTON", given several different baseforms for each word. For instance, such possible baseforms may be:

| AUSTIN | \| AA S T AX N |
|---|---|
| AUSTIN | \| AO S T AX N |
| AUSTIN'S | \| AO S T IX N S |
| BOSTON | \| B AA S T AX N |
| BOSTON | \| B AO S T AX N |

Accordingly, in order to generate distance measures, the processor 24 preferably implements Viterbi alignment in order to match such words of unequal phonetic length.

The distance measures calculated by the rejection processor 24 for the comparisons between the newly uttered word and the existing words are preferably tabulated. The tabular format may be organized in ranks based on an acoustic confusibility threshold value (or values) established within the processor 24. These values can be set by a user prior to real-time use of the rejection facility. If, for example, a single threshold value is set, then any new word which results in a distance measure or score falling at or below the threshold value results in the newly uttered word being identified as likely to cause confusion with the associated existing word. Likewise, if the newly uttered word results in a distance measure falling above the threshold value, then the new word is identified as not likely to cause confusion with the associated existing word. Of course, the level of "not likely to cause confusion" could easily be set to include measures at or above the threshold value, while the "likely to cause confusion" level is set to include measures below the threshold value.

Accordingly, assuming the above threshold example, if the score, e.g., distance measure, for each comparison is greater than the predetermined threshold, then the newly uttered word is added to the vocabulary (step 108) and considered trained. However, if at least one score is equal to or less than the predetermined threshold, then the newly uttered word is rejected (step 110) and, therefore, not added to the vocabulary. The user is then instructed to retry (step 112), that is, return to step 102 and enter a new name or some additional information pertaining to the rejected word.

Feedback of the comparison may be provided to the user via output device 28. Preferably, since the user may be interested in knowing the existing words that are likely to be confused for the newly uttered word, so that, for example, he can avoid them when retrying at step 102, only the comparisons falling in the "likely to cause confusion" group are indicated to him. However, the entire table of comparisons can just as easily be provided to the output device 30.

Also, it is to be appreciated that the number of comparisons of the newly uttered word to existing words may be reduced such that only a subset of all existing words are compared to the newly uttered word. This may be accomplished in several ways. For example, if the new word is to be only used as a verb, this could be identified at the input stage (step 102) and, as a result, the processor 24 would only compare the new word to existing words capable of being verbs, provided that the existing words were also previously so categorized or identified.

Nonetheless, an example of such tabular results generated during the comparison step 106 is given below:

| WORD 1 | LEFEME SEQUENCE # | WORD 2 | LEFEME SEQUENCE # | DISTANCE MEASURE |
|--------|-------------------|--------|-------------------|------------------|
| LAWYER | (47690) | MOYER | (31513) | 1607.54 |
| LAWYER | (47690) | ROYER | (38483) | 1898.11 | where "WORD 1" is the newly uttered word being tested, "WORD 2" are the existing words, and "DISTANCE MEASURE" is the distance measure or score resulting from lefeme sequence comparison. The distance measure may be a unitless, relative number depending on the type of distance metric employed. The "LEFEME SEQUENCE #" is merely an index number assigned to each lefeme sequence. If, for example, the acoustic confusibility threshold value were set at 1500.00, then neither "ROYER" or "MOYER" would be considered as potentially acoustically confusing with respect to the word "LAWYER", since their distance measures fall above the threshold value. Thus, the newly uttered word would be automatically added with a confidence level that acoustic confusion will likely not occur.

However, consider the following tabular result example:

| WORD 1 | LEFEME SEQUENCE # | WORD 2 | LEFEME SEQUENCE # | DISTANCE MEASURE |
|--------|-------------------|--------|-------------------|------------------|
| LAYDEN | (32228) | LAYDON | (31518) | 1168.42 |
| LAYDEN | (32228) | LAYTEN | (31526) | 0.00000 |
| LAYDEN | (32228) | LEIGHTON | (31793) | 0.00000 |
| LAYDEN | (32228) | LEYTON | (31517) | 0.00000 |

In this case, the newly uttered word "LAYDEN" is compared to all existing words and the words "LAYDON", "LAYTEN", "LEIGHTON" and "LEYTON" represent words that fall below the threshold value of 1500.00. In fact, the latter three words result in a distance measure of 0.00000 meaning that the new word and these words all have the same baseforms.

Thus, in this case, the newly uttered word which yields such results falling below the threshold are automatically rejected by the rejection processor 24. As mentioned, the above results may be indicated to the user via, for example, a visual display or TTS system, so that he will know which other words to possibly avoid when re-entering a different new word.

As an alternative to automatically rejecting an acoustically confusing word, the rejection processor 24 may prompt the user to add additional information pertaining to the originally input word. This information may serve to distinguish the otherwise acoustically confusing word from the existing vocabulary words. This information may be, for example, contextual information regarding the word. For instance in a repertory dialing application, if the name "LAYDEN" were rejected due to its acoustic similarity to other vocabulary names, e.g., "LEIGHTON", etc., then the user may retry the training process by providing further context. That is, the user may retry step 102 by stating "LAYDEN FROM MANHATTAN." Then, steps 104 and 106 are repeated to determine whether the new entry should be added or rejected. The processor 24, through the output device 30, may also give the user the option to include the new originally input word anyway, if the user sees that the word is near the threshold (e.g., near 1500.00) and he is willing to take the risk of acoustic confusion.

The present invention also preferably includes the capability to provide the speech recognition engine with an instruction to exclude any competing (i.e., identified as acoustically confusing) existing words from the active vocabulary during real-time decoding when the new word is uttered. That is, the user can input a command to the processor 24, via input device 28, indicating that he wishes to add the originally input word to the vocabulary but, in order to avoid acoustic confusion, to temporarily exclude the identified competing existing words.

It is to be understood that, based on experiments, distance ranges can be provided for safe, troubling and confusing words. In this case, the table would be set up to rank results in accordance with more than one threshold (i.e., the respective threshold values that separate the "safe", "troubling", and "confusing" categories). In which case, the rejection processor 24 would only reject words falling in the "confusing" category. Nonetheless, the user is still preferably provided with indication of the "confusing" and "troubling" words, in order to aid in selecting another new word less likely to cause acoustic confusion during real-time recognition.

It is to be appreciated that the selection of a distance metric for calculating the distance measures is arbitrary and, as a result, different distance metrics may be employed in accordance with the invention. Thus, the distance metrics below are merely examples of known measuring techniques and are not intended to limit the invention.

The Kuhlback-Liebler distance between two Gaussian distributions is:

$$d\langle N(\mu_1, \sigma_1), N(\mu_2, \sigma_2)\rangle = \sum_{i=0}^{i=n} \frac{\sigma_{1_i}^2}{\sigma_{2_i}^2} + \frac{\sigma_{2_i}^2}{\sigma_{1_i}^2} +$$

$$(\mu_1 - \mu_2)^2 * \left(\frac{1}{\sigma^2_{1_i}} + \frac{1}{\sigma^2_{2_i}}\right) - 2$$

This distance metric is preferably modified to work with Gaussian mixtures by going through the set of mixtures in a first class and finding the minimum distance to a second class. Then, the total distance between the first class element (that had the minimal distance to a member of the second class) to all members of the second class is computed. Note that the weight of the mixture is used here to differentiate the relative importances of the members of the first class. The same procedure is done to elements of the second class. Then, the total distance between the first class and the second class is the sum of these distances. Other examples of distance metrics which may be employed are the L2 distance metric and the Mahalnobis or weighted Euclidian distance metric, to name a few.

This procedure is carried out for all leaves in the system and a symmetric matrix such as is shown below is produced identifying all the pair-wise distances between leaves. The distance matrix is subsequently used to find the total distance between two words. An example of such a symmetric matrix is as follows:

| 0 | 266.913 | 3210.71 | 8778.35 | 1834.3 |
|---|---|---|---|---|
| 266.913 | 0 | 3099.7 | 12318.4 | 1668.16 |
| 3210.71 | 3099.7 | 0 | 1583.21 | 1896.43 |
| 8778.35 | 12318.4 | 1583.21 | 0 | 891.11 |
| 1834.3 | 1668.16 | 1896.43 | 891.11 | 0 |

In this example, the first column and row represent leaf number 1. The second column and row represent leaf number 2, and so on. Therefore, the diagonal zeros (0) represent the fact that the leaf distance to itself is zero and the matrix is symmetric because the distance from leaf 2 to leaf 1 is the same as the distance from leaf 1 to leaf 2.

Nonetheless, regardless of the distance metric employed, if there are no words which fall at or below the acoustic confusibility threshold value, then the newly uttered word (preferably including baseform and lefeme sequence) is added to the vocabulary (step 108).

However, if a new word is identified as potentially acoustically confusible with one or more existing words, the processor 24 then preferably presents this information to the user and prompts the user to enter an alternative word. The alternative new word is then processed in a similar manner as explained above, starting from step 102, in order to obtain new results. Also, as previously mentioned, the user may choose to input additional contextual information regarding the word originally input, rather than abandoning such word and choosing an alternative word. For example, the user may indicate that the word is a verb or a noun, or may provide an example of usage in a sentence (e.g., "LAYDEN FROM MANHATTAN"). The originally input word with the additional contextual information is then processed, starting from step 104, in order to obtain new results. Also, as previously explained, the user may request that the new word be added but the competing existing words be temporarily excluded during a decoding session including that new word.

Alternatively, at step 106, the user can choose to indicate (via the input device 28) to the homophone rejection processor 24 that an additional, more detailed search is necessary. That is, depending on the depth that the initial comparison between the newly uttered word and existing vocabulary words was performed, the results may not be satisfactory and, as such, he may choose to have the rejection processor 24 perform a deeper search. It is to be appreciated that the depth of the search is controlled by the beamwidth in the Viterbi algorithm for the selected words. Thus, upon the request from the user, the processor 24 increases the beamwidth and the deeper search is performed. In this manner, the processor is increasing the scope of the comparison and thus preventing errors (e.g., failure to identify acoustically confusing words from the existing vocabulary) that may occur from a less detailed search.

Still further, in yet another alternative embodiment, the processor 24, itself, may automatically make a determination that a more detailed search is necessary. This is possible by presetting, in the processor 24, ranges of measures which, if reached in step 106, trigger the processor to increase the beamwidth of the Viterbi algorithm and then perform the deeper search. In this case, the user is only presented with the results of the more detailed search.

As previously mentioned, rather than present the user with results from the homophone rejection facility on a visual display, a TTS system may be employed to provide spoken results to the user. In this way, the present invention finds advantageous uses in telephone applications.

Furthermore, it is to be appreciated that when the sequence of lefemes is produced by the ballistic labeler (step 104), it is possible to complete the sequence by looking up, from an associated table, distances between lefemes. Thereafter, it is possible to produce alternate pronunciations for the newly uttered word by selecting all possible combinations of lefemes within a given distance of the lefeme sequence produced by the ballistic labeler. A consistency check may thereafter be performed via Viterbi alignment of the different resulting baseforms with the acoustic utterance. Only baseforms with an acceptable score are maintained and added as alternative pronunciations to the vocabulary. In other words, the present invention also provides a tool which, based on one acoustic instance of a new word, allows for the addition of the new word to the vocabulary, along with its observed baseform, as well as the words' most probable alternate pronunciations.

It is to be appreciated that, given the teachings herein, one of ordinary skill will contemplate many and varied applications for the homophone rejection facility of the present invention. By way of example only, the present invention may complement or be integrated with IBM's ViaVoice or ViaVoice Gold software, speech toolkits, and research engines. In fact, any applications where new words are added to a speech recognizer are contemplated, including any English or foreign language speech recognition system or even any multi-lingual speech recognition system.

The present invention thus provides an alternative to the conventional techniques to do rejection of acoustically trained words, and is the only method available (other than manual human intervention) to automatically compare combinations of lists of words, uttered by a user, with the system indicating which words are too similar to produce good recognition results.

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

What is claimed is:

1. A method of training at least one new word for addition to a vocabulary of a speech recognition engine containing existing words, the method comprising the steps of:

(a) a user uttering the at least one new word;

(b) computing respective measures between the at least one newly uttered word and at least a portion of the existing vocabulary words, the respective measures indicative of acoustic similarity between the at least one word and the at least a portion of existing words;

(c) if no measure is within the threshold range, automatically adding the at least one newly uttered word to the vocabulary; and (d) if at least one measure is within a threshold range, refraining from automatically adding the at least one newly uttered word to the vocabulary.

2. The method of claim 1, further comprising the step of prompting the user to input an alternative word or additional information pertaining to the at least one new word.

3. The method of claim 2, wherein the additional information pertaining to the at least one new word includes contextual information.

4. The method of claim 2, wherein the additional information pertaining to the at least one new word includes an instruction by the user to temporarily exclude the existing word associated with a measure within the threshold range from the vocabulary when the at least one newly uttered word is uttered in a real-time decoding session.

5. The method of claim 1, further comprising the step of indicating results associated with the at least one measure to the user.

6. The method of claim 5, wherein the indicating step comprises displaying the results to the user.

7. The method of claim 5, wherein the indicating step comprises speech synthesizing the results for playback to the user.

8. The method of claim 5, wherein the indicating step further comprises the step of prompting the user to request an additional search.

9. The method of claim 8, wherein the additional search includes increasing a beamwidth associated with a Viterbi algorithm performed during the search.

10. The method of claim 1, wherein the step of computing respective measures further comprises the steps of:

(a) generating a leaf sequence for the at least one newly uttered word;

(b) comparing the leaf sequence for the at least one newly uttered word to respective leaf sequences associated with the at least a portion of existing words; and (c) generating respective distance measures in response to the comparisons, the respective distance measures indicative of acoustic distances between the compared leaf sequences.

11. The method of claim 10, wherein the leaf sequence comparison step further comprises performing a best match alignment process between leaf sequences.

12. The method of claim 10, wherein the respective distance measures are calculated via a Kuhlback-Liebler distance metric.

13. The method of claim 10, wherein the leaf sequence generating step also includes generating at least one additional leaf sequence representative of an alternate pronunciation of the newly uttered word.

14. The method of claim 13, wherein a Viterbi alignment is performed with the at least one additional leaf sequence and the first leaf sequence generated with respect to the newly uttered word.

15. The method of claim 14, wherein only additional leaf sequences resulting in acceptable scores are added to the vocabulary as alternate pronunciations.

16. The method of claim 1, wherein step (b) further comprises the step of performing an additional search, if at least one measure is within a threshold range, the additional search including increasing a beamwidth associated with a Viterbi algorithm performed during the search.

17. The method of claim 1, wherein step (a) further comprises the user uttering a first plurality of new words and a second plurality of new words and further wherein steps (b) through (d) are performed for each word such that words from the pluralities which are not acoustically confusing are added to the vocabulary while words from the pluralities which are acoustically confusing are rejected.

18. Computer-based apparatus for training at least one new word for addition to a vocabulary of a speech recognition engine containing existing words, the apparatus comprising:

an input device for receiving the at least one new word uttered by a user;

a processor, operatively coupled to the input device, for computing respective measures between the at least one newly uttered word and at least a portion of the existing vocabulary words, the respective measures indicative of acoustic similarity between the at least one word and the at least a portion of existing words; and if no measure is within the threshold range, the processor automatically adding the at least one newly uttered word to the vocabulary, and if at least one measure is within a threshold range, the processor refraining from automatically adding the at least one newly uttered word to the vocabulary.

19. The apparatus of claim 18, wherein the processor prompts the user to input an alternative word or additional information pertaining to the at least one new word.

20. The apparatus of claim 18, further comprising an output device for indicating results associated with the at least one measure to the user.

21. The apparatus of claim 20, wherein the output device is a display and further wherein the processor causes display of the results to the user on the display.

22. The apparatus of claim 20, wherein the output device is a text-to-speech system and further wherein the processor causes speech synthesis of the results for playback to the user via the text-to-speech system.

23. The apparatus of claim 18, wherein the processor performs an additional search, if at least one measure is within a threshold range, the additional search including increasing a beamwidth associated with a Viterbi algorithm performed during the search.

24. The apparatus of claim 18, wherein the additional information pertaining to the at least one newly uttered word includes contextual information.

25. The apparatus of claim 18, wherein the additional information pertaining to the at least one newly uttered word includes an instruction by the user to temporarily exclude the existing word associated with a measure within the threshold range from the vocabulary when the at least one new word is uttered in a real-time decoding session.

26. The apparatus of claim 18, wherein the input device receives a first plurality of new words and a second plurality of new words uttered by the user and further wherein the processor performs the computing, adding or refraining steps for each word such that words from the pluralities which are not acoustically confusing are added to the vocabulary while words from the pluralities which are acoustically confusing are rejected.

27. The apparatus of claim 18, wherein the processor causes prompting of the user to request an additional search.

28. The apparatus of claim 27, wherein the additional search includes increasing a beamwidth associated with a Viterbi algorithm performed during the search.

29. The apparatus of claim 18, wherein the processor further performs the steps of:
(a) generating a leaf sequence for the at least one newly uttered word;
(b) comparing the leaf sequence for the at least one newly uttered word to respective leaf sequences associated with the at least a portion of the existing words; and
(c) generating respective distance measures in response to the comparisons, the respective distance measures indicative of acoustic distances between the compared leaf sequences.

30. The apparatus of claim 29, wherein the processor further performs a best match alignment process between leaf sequences.

31. The apparatus of claim 29, wherein the processor calculates the respective distance measures via a Kuhlback-Liebler distance metric.

32. The apparatus of claim 29, wherein the leaf sequence generating step also includes generating at least one additional leaf sequence representative of an alternate pronunciation of the newly uttered word.

33. The apparatus of claim 32, wherein a Viterbi alignment is performed with the at least one additional leaf sequence and the first leaf sequence generated with respect to the newly uttered word.

34. The apparatus of claim 33, wherein only additional leaf sequences resulting in acceptable scores are added to the vocabulary as alternate pronunciations.

35. Computer-based apparatus for training at least one new word for addition to a vocabulary of a speech recognition engine containing existing words, the apparatus comprising:
user input means for receiving at least one new word uttered by the user;
computing means for computing respective measures between an acoustic model of the at least one newly uttered word and acoustic models of at least a portion of the existing vocabulary words, the respective measures indicative of acoustic similarity between the at least one word and the at least a portion of existing words;
adding means for automatically adding the at least one newly uttered word to the vocabulary, if no measure is within the threshold range; and
rejecting means for automatically rejecting the at least one newly uttered word, if at least one measure is within a threshold range.

* * * * *